United States Patent [19]
Hess

[11] 3,897,101
[45] July 29, 1975

[54] DRIVER'S SEAT WITH INERTIA-RESPONSIVE LOCKING ARRANGEMENT

[75] Inventor: Peter Hess, Coburg, Germany

[73] Assignee: Metallwerk Max Brose & Co., Coburg, Germany

[22] Filed: May 7, 1974

[21] Appl. No.: 467,625

[30] Foreign Application Priority Data
May 18, 1973 Germany.............................. 2325292

[52] U.S. Cl....................... 296/65 A; 74/3; 74/522; 248/429; 297/216
[51] Int. Cl.².......................................... B60N 1/08
[58] Field of Search......... 296/65 R, 65 A; 297/216, 297/345; 74/3, 522; 248/429, 424

[56] References Cited
UNITED STATES PATENTS

| 119,118 | 9/1971 | Campbell............................ 248/429 |
| 2,124,755 | 7/1938 | Simpson.............................. 297/345 |
| 2,973,029 | 2/1961 | Schlosstein .......................... 297/216 |
| 3,027,131 | 3/1962 | Piccione .............................. 248/429 |

Primary Examiner—Robert J. Spar
Assistant Examiner—Gary Auton
Attorney, Agent, or Firm—Hans Berman

[57] ABSTRACT

The driver's seat in a motor car is equipped with pivotally mounted detents normally held out of engagement with racks on the seat base by gravity or by weak springs, but engaged upon sudden acceleration or deceleration to prevent shifting of the seat if the latch associated with the conventional seat adjusting mechanism fails, or if it happens to be disengaged by the driver at the moment of sudden speed change.

8 Claims, 2 Drawing Figures

PATENTED JUL 29 1975  3,897,101

DRIVER'S SEAT WITH INERTIA-RESPONSIVE LOCKING ARRANGEMENT

This invention relates to seats, such as the driver's seat in a motorcar, which may be shifted forward and backward manually or by a motor, and particularly to an inertia-responsive safety lock for such a seat.

The conventional adjusting mechanisms for vehicle seats, whether operated manually or by a motor, are equipped with spring-loaded latches for maintaining an adjusted position of the seat. The latches are released while an adjustment is made and frequently tend to release accidentally. If a seat latch is in the released condition, intentionally or accidentally, while the rate of movement of the vehicle changes abruptly, as by sudden pressure of the driver's foot on the accelerator pedal or the brake pedal exerted involuntarily during a movement intended for actuating the seat shifting mechanism, the driver may be thrown forward or rearward with his seat and momentarily lose control of the vehicle.

The object of the invention is the provision of an adjustable seat which freezes in its position relative to the direction of vehicle movement in the event of sudden acceleration or deceleration.

With this object and others in view, the invention provides a seat arrangement of the type described in which a seat is mounted on a base for adjusting movement in a desired, horizontally extending direction. A row of alternating teeth and gaps extends on the base in this direction, the teeth being fixedly secured to the base. A two-armed lever is mounted on the seat for pivoting movement about an axis transverse to the direction of seat movement. One arm of the lever has a terminal pawl portion shaped for being received in the gaps in a first angular position of the lever while a terminal contact portion of the other lever arm is shaped to prevent its being received in the gaps. The lever is biased toward a second angular position in which the contact portion sequentially engages the teeth on the base during movement of the seat member, and the pawl portion clears the teeth. The pawl and contact portions are spaced in the direction of seat movement, and the contact portion clears the teeth in the aforementioned first angular position of the lever.

The positions of the teeth and the lever on the base and seat may be reversed without change in function.

Other features, additional objects, and many of the attendant advantages of this invention will readily be appreciated as the same becomes better understood by reference to the following description of the drawing in which.

Figure 1:
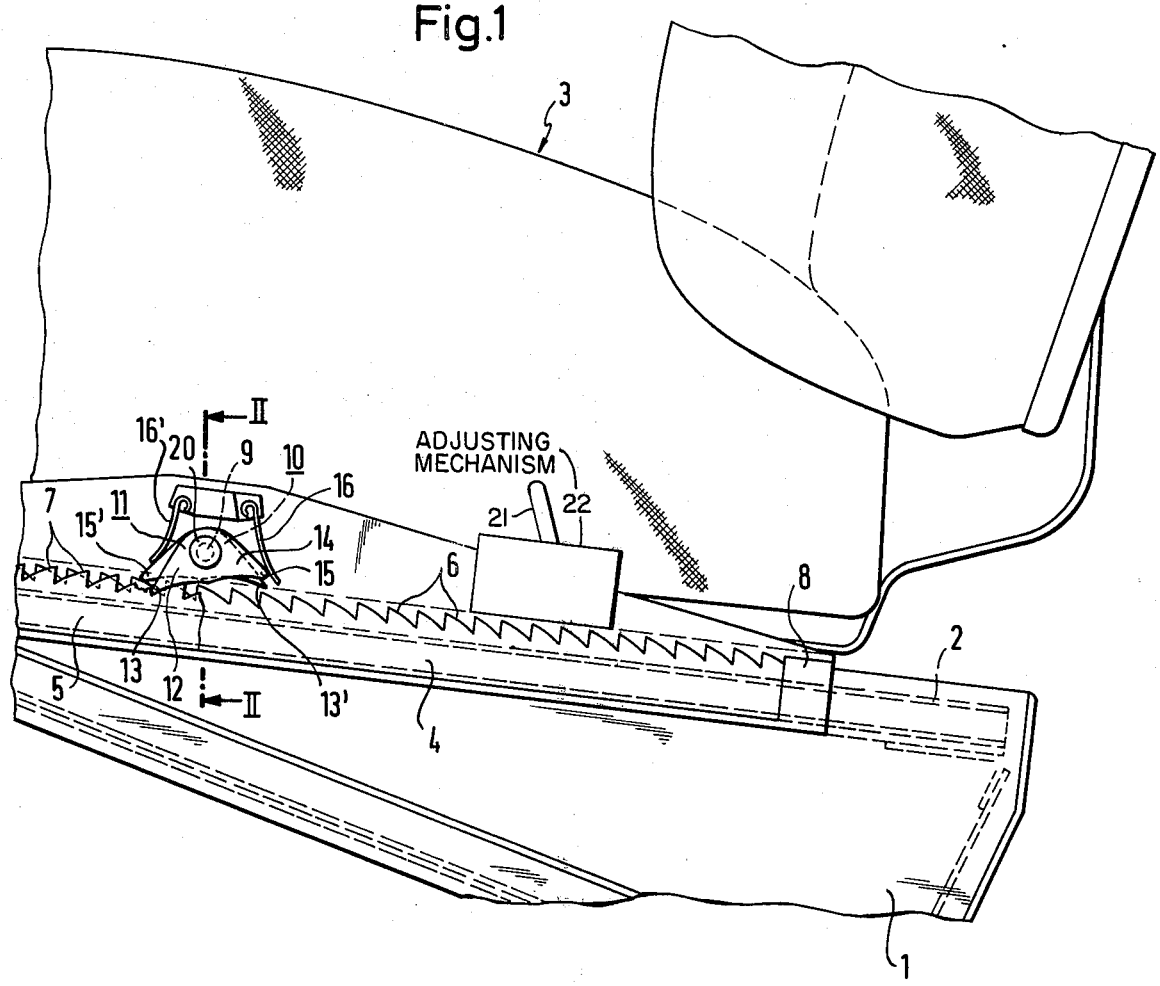
FIG. 1 shows the driver's seat in a motorcar infragmentary side-elevation.

Referring now to the drawing in detail, and initially to FIG. 1, there is shown only as much of an otherwise conventional arrangement of the left front seat in an automobile as is needed for an understanding of the invention. A seat base 1 is fixedly attached to the body floor of the vehicle in a manner not shown. Guide rails 2 on both sides of the base 1 extend generally in the direction of vehicle movement at a small acute angle to the horizontal. A seat 3 is slidably mounted on the rails 2 by means of corresponding rails 8 attached to the seat, only one rail 2, 8 being seen in the drawing.

A rack 4 whose saw teeth 6 are inclined in a forward direction is spot-welded to a rack 5, integral with the rail 2, whose saw teeth 7 are identical with the teeth 6 but inclined in a rearward direction. The axis of a pivot pin 9 secured to the rail 8 is perpendicular to the direction of seat movement, and two detents 10, 11 are axially juxtaposed on the pin 9 for free and independent pivotal movement in respective planes which include the rows of teeth 6, 7 and the intervening gaps. The detents 10, 11 are identical, two-armed, sheet metal levers.

The forward-directed arm 12 of the detent 11 terminates in a pawl 13 which is conformingly received in a gap between two teeth 7 in the illustrated condition of the apparatus. The rearwardly directed arm 14 terminates in a rounded contact portion 15 so dimensioned and shaped that it cannot enter the gaps between the teeth 7 during the relative movement of the seat 3 and the base 1 although a weak leaf spring 16 on the rail 8 biases the arm 14 toward the teeth 7, and thereby biases the pawl 13 out of the illustrated position.

The normal position of the two detents is assumed in the condition illustrated in FIG. 1 by the detent 10 whose forwardly directed contact portion 15' abuttingly engages a tooth 6 under the biasing force of a leaf spring 16', whereby the pawl 13' on the rearwardly directed arm of the detent 10 is held in a position in which it clears the teeth 6. Under normal conditions, both pawls 13, 13' clear the associated teeth 6, 7 and both contact portions 15, 15' engage the teeth so that the detents do not interfere with the adjusting movement of the seat 3, and the latch 21 of the conventional adjusting mechanism 22 holds the seat 3 in its adjusted position.

In the event of sudden and strong acceleration or deceleration, while the latch 21 is inoperative, one of the detents 10, 11 is pivoted by inertia on the pin against the restraint of the associated weak leaf spring 16, 16', and the seat 3 is prevented from shifting on the base 1 by more than one tooth spacing as a pawl 13, 13' is caught in the gap between teeth 6, 7, in the manner shown at 13 in FIG. 1. The pawl 13 is readily released from its illustrated position by moving the seat 3 a short distance rearward, whereupon the non-illustrated rest position of the locking mechanism is restored by the spring 16.

If the pin 9 is mounted on the rail 8 for adjusting movement toward and away from the base 1, the detents 10, 11 may be lowered until the contact portions 15, 15' engage corresponding teeth 7, 6, and the pawls 13, 13' are swung into gaps between the teeth, thereby locking the seat on the base even in the absence of sudden acceleration or deceleration. This modification is useful as a safety measure in the event of malfunctioning of the conventional latch 21.

Figure 2:
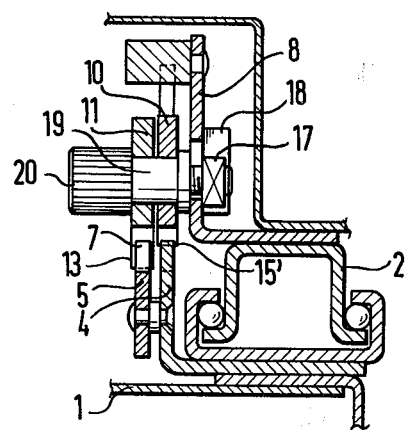
FIG. 2 shows a modification of the apparatus of FIG. 1 in section on the line II—II.

The minor changes in the apparatus of FIG. 1 required for achieving the added function of the locking arrangement of the invention are shown in FIG. 2. The face of the rail 8 remote from the detents 10, 11 carries a guide channel 18 in which a square nut 17 may slide at right angles to the rows of teeth and gaps on the base 1, but cannot turn. The pivot pin 19 whose intermediate cylindrical portion pivotally carries the detents 10, 11 has a reduced end portion which passes through the rail 8 and threadedly engages the nut 17. An integral, enlarged, knurled head 20 on the other end of the pin 19 axially secures the detents 10, 11 and serves as a handle by means of which the pin 19 may be adjusted between its normal operative position remote from the teeth 6, 7 in which it functions as the afore-described pin 9, and a locking position adjacent the teeth in which both pawls 13, 13' engage gaps between the teeth 6, 7 while both contact portions 15, 15' abuttingly engage the teeth 6, 7 in a manner not specifically shown but obvious from FIG. 1. Turning the knob 20 loosens or fastens the nut 17 in the channel 18.

The springs 16, 16' may be omitted if the weight distribution in the detents 10, 11 is chosen to bias the contact portions 15, 15' toward the teeth 6, 7 by gravity. While such an arrangement is simpler and not dependent on the condition of springs, it is affected by the inclination of a road on which the vehicle travels, and springs are generally preferred. Other variations of the apparatus specifically described and illustrated will readily suggest themselves to those skilled in the art.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A seat arrangement for a motor vehicle comprising:
   a. a base member and main locking system;
   b. a seat member mounted on said base member for adjusting movement in a predetermined direction;
   c. an inertia operated auxilary locking system comprising a row of alternating teeth and gaps extending in said direction on one of said members, said teeth being fixedly secured to said one member;
   d. a two-armed lever mounted on the other member for pivoting movement about an axis transverse to said direction,
      1. one arm of said lever having a terminal pawl portion shaped for being lockingly received in said gaps in a first angular position of said lever,
      2. the other arm of said lever having a terminal contact portion shaped to prevent said contact portion from being received lockingly in said gaps; and
   e. biasing means biasing said lever toward a second angular position,
      1. said contact portion sequentially engaging said teeth during said movement of said seat member while said lever is in said second position,
      2. said pawl portion clearing said teeth in said second position of said lever, and
      3. said pawl portion being spaced from said contact portion in said direction, the auxilary locking system further comprising a pivot pin on said other member, said lever being mounted on said pivot pin for pivoting movement about said axis, guide means on said other member for guiding said pivot pin transversely to said direction and said axis between an operative position remote from said row and a locking position adjacent said row, said pawl portion clearing said teeth in said second angular position of the lever and said contact position clearing said teeth in said first angular position of said lever when the lever is in said operative position, said pawl portion being received in one of said gaps and said contact portion abuttingly engaging one of said teeth in said locking position of said pivot pin.

2. An arrangement as set forth in claim 1, wherein said biasing means include a spring operatively interposed between said lever and said other member.

3. An arrangement as set forth in claim 1, wherein said base member is said one member.

4. An arrangement as set forth in claim 3, a guide rail on said base member, said seat member being slidably mounted on said rail, said rail being formed with said row.

5. An arrangement as set forth in claim 3, wherein said teeth are obliquely inclined in a direction from said pawl portion toward said contact portion.

6. An arrangement as set forth in claim 3, further comprising a second row of alternating teeth and gaps extending in said direction on said base member, the teeth of said second row being fixedly secured to said base member; a second two-armed lever mounted on said seat member for pivoting movement about said axis; one arm of said second lever having a terminal pawl portion shaped for being lockingly received in the gaps of said second row in a first angular position of said second lever, the other arm of said second lever having a terminal contact portion shaped to prevent said contact portion from being lockingly received in said gaps, and second biasing means biasing said second lever toward a second angular position, the contact portion of said second lever sequentially engaging the teeth of said second row during said movement of said seat member while said second lever is in said second position, said pawl portion of said second lever clearing the teeth of said second row in said second position of said second lever, the pawl portion of said second lever being spaced from the contact portion of said second lever opposite to the direction of spacing of the pawl portion of said first-mentioned lever from the contact portion of said first-mentioned lever.

7. An arrangement as set forth in claim 6, a pivot pin on said seat member, said two-armed levers being mounted on said pivot pin for pivoting movement about said axis.

8. An arrangement as set forth in claim 7, wherein the teeth of said second row are obliquely inclined in a direction from said pawl portion of said second lever toward said contact portion of said second lever.

* * * * *